United States Patent [19]
Crider et al.

[11] Patent Number: 5,458,537
[45] Date of Patent: Oct. 17, 1995

[54] SWITCH APPARATUS FOR POWER WINCH

[75] Inventors: Grant W. Crider, Bremen; Charlie Starnes, Blountsville, both of Ala.

[73] Assignee: Hired Hand Manufacturing, Inc., Bremen, Ala.

[21] Appl. No.: 184,205

[22] Filed: Jan. 18, 1994

[51] Int. Cl.[6] ............................................. F24F 11/053
[52] U.S. Cl. ........................... 454/256; 119/21; 454/239
[58] Field of Search ........................... 119/21; 236/49.3, 236/49.4; 454/239, 256, 258

[56] References Cited

U.S. PATENT DOCUMENTS 3,042,001  7/1962  Dubie et al. ............................ 119/21
4,241,871  12/1980  Newell, III et al. .................. 236/44.3
4,882,260  5/1989  Spilde .................................. 236/49.4

Primary Examiner—Harold Joyce
Attorney, Agent, or Firm—Veal & Marsh

[57] ABSTRACT

A device for actuating switches in a power winch apparatus used in livestock enclosures. An actuator block is mounted on a linear rod within the frame of the power winch. When the winch is operated the movable load bearing block of the power winch engages and moves manually adjustable limits on the rod. Subsequently the actuator block mounted to the rod moves relative to a series of switches which are electrically connected to auxiliary devices as well as the power supply and drive motor of the power winch.

16 Claims, 4 Drawing Sheets

SWITCH APPARATUS FOR POWER WINCH

FIELD OF THE INVENTION

This invention relates to a device for actuating switches in a power winch apparatus. More particularly, the invention relates to a device which allows the setting of adjustable limits to control range of movement of said winch. In greater particularity, the present invention relates to a device which utilizes an actuator block mounted to a carrier means for selective concomitant movement with the cables of said power winch. The actuator block engaging and actuating switches are electrically connected to auxiliary devices, the winch motor and a power supply. The adjustable limits set the upper and lower positions for curtains mechanically coupled to said power winch for use in ventilating a livestock enclosure.

BACKGROUND OF THE INVENTION

Livestock enclosures require adequate ventilation and temperature control to maintain the health of the animals sheltered within such enclosures. Inadequate ventilation can lead to the spread of disease among the animals causing a loss to the operator. Stress on the animals from the lack of ventilation can slow the animal's rate of gain thus reducing the livestock producer's already slim profit margin. Livestock such as poultry are sensitive to changes in temperature and ventilation which can result in catastrophic losses if these factors are not carefully monitored and controlled.

Window vents, fans, and curtains have all been used in the past as means to control the amount of air moving through livestock enclosures. The curtains raise and lower on the sides of the livestock enclosure as part of a temperature and ventilation control system. These curtains can be raised and lowered by a power winch mechanism such as the Power Curtain controller developed by the Hired Hand Corporation. This power winch controller is a straight line frame mounted with an in-line gear motor. The motor is coupled to a thrust bearing to drive a heavy duty screw. This screw is coupled to a movable load nut which carries the curtain cables. The curtain cables are connected through a pulley system to the curtains. Limit switches at the top and bottom of the frame are activated by the movable nut to activate auxiliary devices and safety limit switches to prevent the system from malfunctioning and damaging the components.

A major disadvantage of the curtain controller system is that in order to alter the upper and lower limits of the movement of the load nut and mechanically coupled curtains, the limit switches themselves must be repositioned. The upper and lower limits of the curtains will vary with the season as well as with changes in the stage of livestock growth. There is a need in the curtain controller industry for a simple means to adjust the upper and lower limits of the ventilation curtains with as little mechanical alteration of the controller as possible.

Another disadvantage of the present controllers is that the limit switches are on the top and bottom of the controller frame. This requires that the controller be wired at the top and bottom for electrically connecting the respective switches. This increases the cost of manufacturing the controller unit as well as increasing the probability of an electrical malfunction due to excess wiring. There is a need in the livestock industry for a curtain controller with switches mounted near the bottom of the frame in close proximity to the gear motor and a source of electrical power.

SUMMARY OF THE INVENTION

It is an object of the present invention to provide a reliable means for actuating auxiliary ventilation switches, limit switches, and safety backup switches in a power winch controller for livestock ventilation curtains.

Another object of this invention is to provide a simple means for adjusting the upper and lower limits in a power winch controller for livestock ventilation curtains.

Yet another object of this invention is to provide a power winch controller for opening and closing livestock ventilation curtains with switches mounted to said controller near a power supply source to reduce manufacturing costs and reduce risk of electrical malfunction.

The present invention accomplishes these objects through the use of a switch actuating mechanism mounted within the frame of power winch controller. This mechanism comprises a vertical rod mounted parallel to the in-line gear motor bushing, screw and movable load nut of the power winch controller. The vertical rod is spring loaded at either end for limited vertical movement within the power winch controller frame and has adjustable limit nuts above and below the position of the movable load nut. A connecting means such as a slip ring is fixed at one end to the movable load nut while the other end circumscribes and moves freely relative the vertical rod. The vertical rod has an actuator block affixed thereto at a lower end. The actuator block has relieved portions on either side defining an opposing series of steps to engage and activate in sequence auxiliary, limit and safety switches mounted on either side of the actuating block. When the controller is activated, the gear motor will move the load nut up the screw until the slip ring abuts the upper limit nut. At this time the vertical rod will be moved vertically upward while the steps on one side of the actuator block sequentially actuate the auxiliary switch, then the limit switch and finally safety switch to kill the power should the limit switch fail to activate properly. The same sequence of events occurs when the movable load nut engages the lower limit thereby pushing the rod and affixed actuator block downward past the second set of auxiliary, limit and safety switches.

DESCRIPTION OF THE DRAWINGS

Apparatus incorporating features of the present invention are shown in the accompanying drawings, which form a portion of this application, wherein.

DESCRIPTION OF A PREFERRED EMBODIMENT

Figure 1:
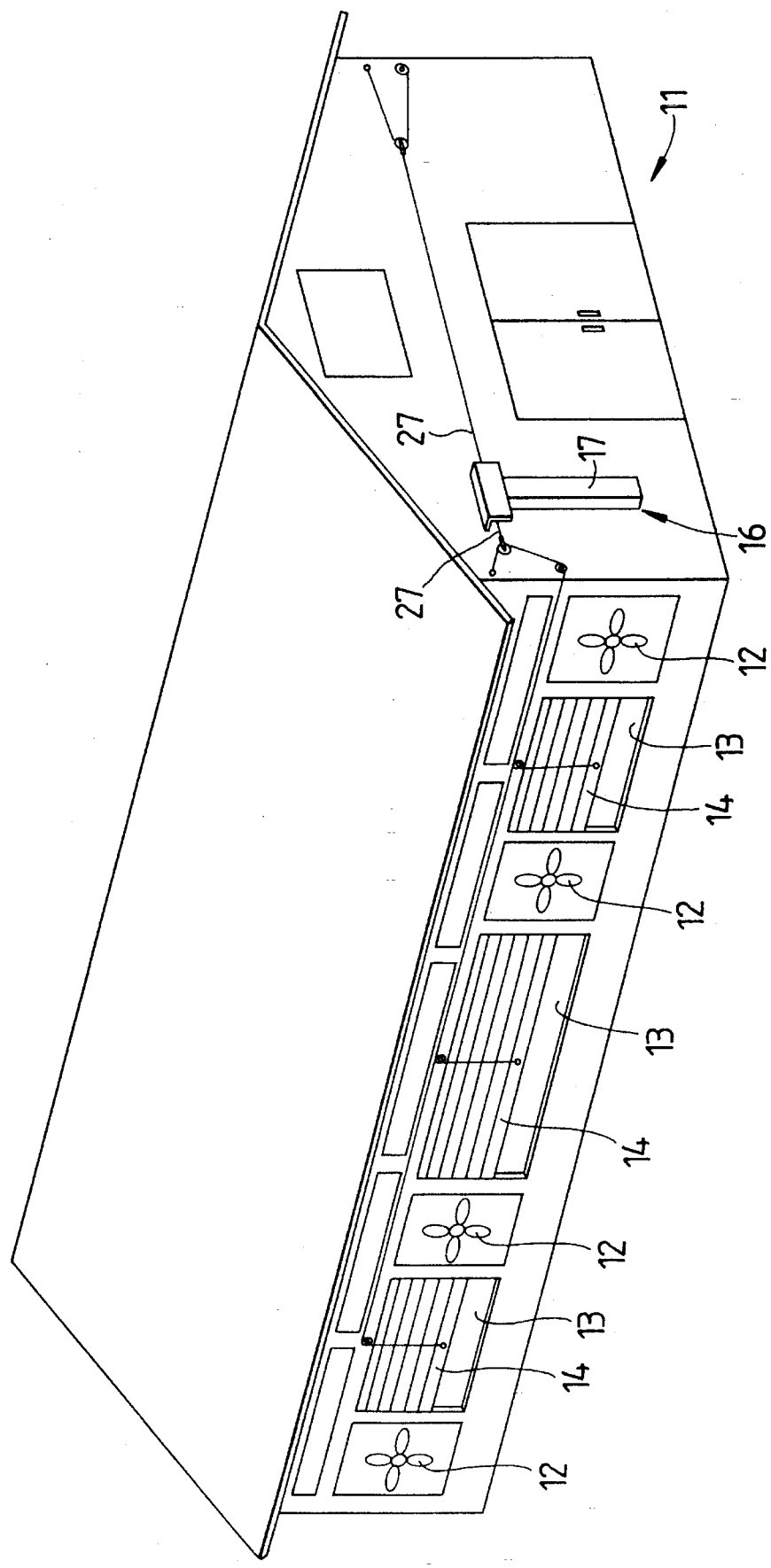
FIG. 1 is a perspective view of a livestock enclosure utilizing this invention.

Livestock enclosures 11 such as shown in FIG. 1 are conventionally ventilated by electric fans 12 which circulate air through the enclosure 11. The enclosures have at least one ventilation opening 13 along the walls of the enclosure 11. The ventilation opening is covered by large movable curtains 14. Livestock within such enclosures 11 are contained in close proximity with each other and adequate ventilation is necessary for the health and feed conversion efficiency of such livestock. From the foregoing it can be seen that the curtains 14 can be opened and closed to adjust the ventilation as well as the temperature within the enclosure. Typically, a powered winch 16 provides the mechanical means for raising and lowering the curtains 14.

Figure 2:
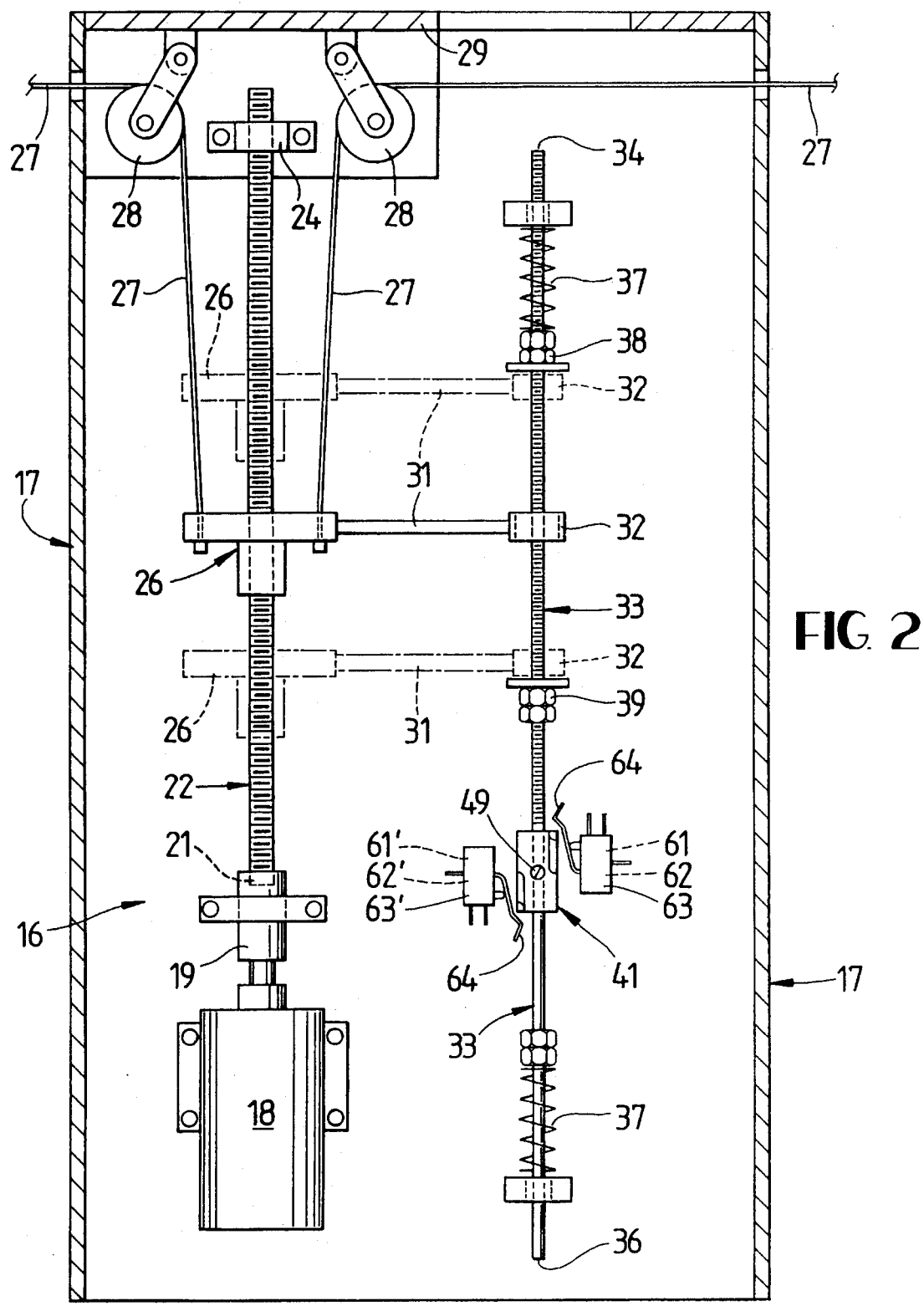
FIG. 2 is a sectional view of a power winch controller employing the present invention.

The powered winch 16 is shown in greater detail in FIG. 2. A formed channel of stainless steel forms the mainframe 17 of powered winch 16. An in-line gear motor 18 is mounted to a lower end of mainframe 17. This gear motor 18 typically has ⅙ h.p. and drives a thrust bearing 19 mounted atop motor 18. This thrust bearing 19 is coupled to a lower end 21 of heavy duty screw 22. An upper end 23 of screw 22 couples with an upper bearing 24 mounted near the top of mainframe 17. A load nut 26 operationally engages the screw 22 for vertical movement relative the screw 22 when screw 22 is rotated by motor 18. Cables 27 are affixed to load nut 26. These cables 27 are heavy duty flexible 3/16 or ¼ inch aircraft cables. Pulleys 28 are mounted to a heavy duty head bracket 29 affixed to an upper end of mainframe 17. The cables 27 thread through pulleys 28 and out the top of mainframe 17 of power winch 16. The cables 27 in turn are mechanically coupled to raise and lower the curtains 14 as seen in FIG. 1. With the three pulleys shown, a variety of cable runs can be envisioned which will afford great flexibility in positioning the power winch 16 to a livestock enclosure 11.

A horizontal slip ring member 31 is affixed at one end to load nut 26 and terminates in a horizontal slip ring 32 at the other end. This slip ring 32 circumscribes without interference a vertical rod 33. The vertical rod 33 is mounted within the mainframe 17 at an upper end 34 and lower end 36 and is parallel to screw 22. Springs 37 are mounted at the ends 34 and 36 of rod 33 to permit limited vertical movement of rod 33 within the mainframe 17.

Figure 6:
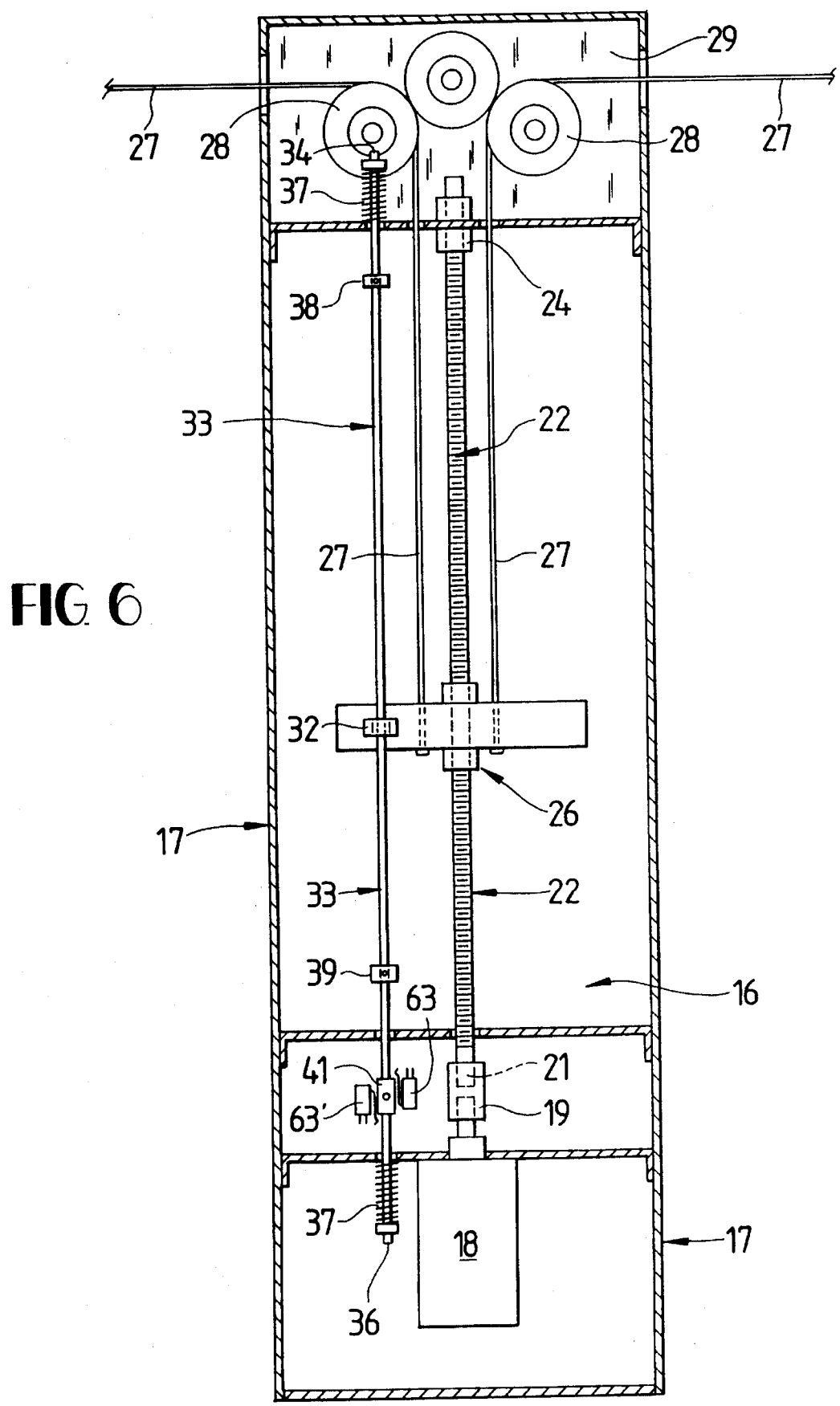
FIG. 6 is a sectional view of a power winch controller.

The rod 33 is threaded near the upper end 34 and an upper adjusting nut 38 operationally engages the rod 33 for vertical adjustment relative to the rod 33. There is a threaded portion of the rod 33 at a point parallel the lower end 21 of screw 22. A lower adjusting nut 39 operationally engages the rod 33 for vertical adjustment relative rod 33. Another embodiment shown in FIG. 6 includes affixing the slip ring 32 directly to load nut 26. In the embodiment, the vertical rod 33 is unthreaded and adjusting nuts 38 and 39 are adjustably affixed to rod 33 with set screws.

Figure 3:
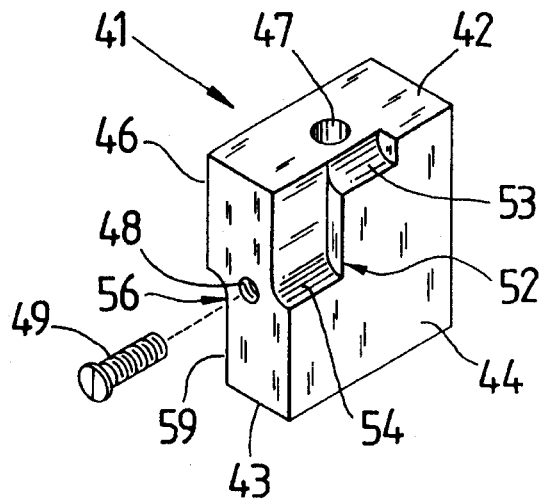
FIG. 3 is a perspective view of the actuating block.
Figure 4:
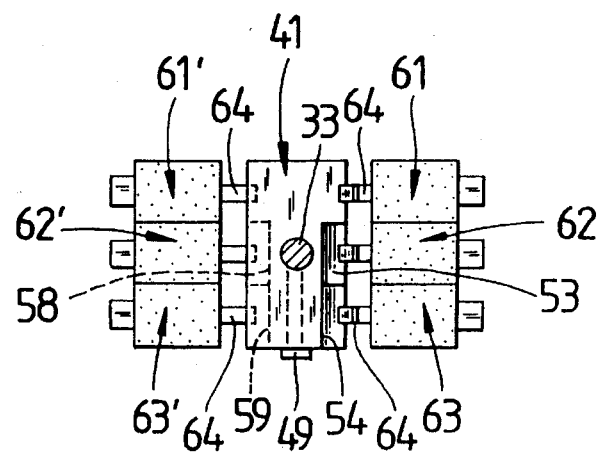
FIG. 4 is a top view of actuating block and sets of actuating switches.

Affixed to the lower end 36 of vertical rod 33 is actuator block 41. The actuator block 41 circumscribes rod 33 and is held in place by set screw 49. The actuator block 41 is shown in greater detail in FIG. 3 and comprises an upper surface 42, a lower surface 43, a face 44 and opposing face 46 intermediate upper and lower surfaces. The actuator block 41 has a centered aperture 47 extending axially therethrough for mounting on rod 33. A threaded aperture 48 extends transversely through block 41 for accepting a set screw 49 to hold the block 41 in place about rod 33. Stepped engagement surfaces 53 and 54 define a relieved portion 52 of face 44 of block 41. Similarly opposing face 46 of block 41 has stepped engagement surfaces 58 and 59 which define a relieved portion 56 as is best seen in the top plan view of FIG. 4.

Figure 5:
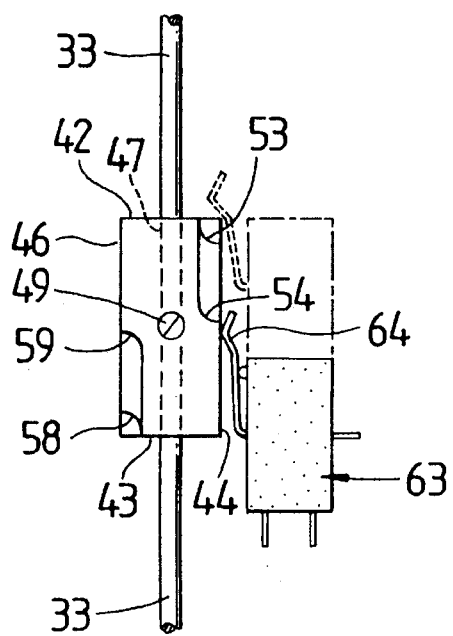
FIG. 5 is a side elevational view of the actuating switches.

An auxiliary switch 61, a limit switch 62 and a safety switch 63 are mounted in parallel to the mainframe 17 beside the actuator block 41 as seen in FIGS. 2 and 5. A switch lever 64 extends from the switches 61, 62, and 63. An identical set of switches including an auxiliary switch 61', a limit switch 62', and a safety switch 63' are inversely mounted to the mainframe 17 beside the face 46 of actuator block 41 as shown in FIGS. 2 and 5. The auxiliary switches 61 and 61' are electrically connected to auxiliary devices such as fans 12. The limit switches 62 and 62' are electrically connected to motor 18. Safety switches 63 and 63' are electrically connected to a power supply source connected to motor 18.

METHOD OF OPERATION

When in actual operation, the power winch 16 performs as partially described hereinabove. The motor 18 rotates bearing 19 and screw 22 inducing vertical movement of load nut 26 relative said screw 22. The slip ring member 31 is moving with load nut 26 until the ring 32 of said slip ring member 31 abuts the upper adjusting nut 38. The slip ring 32 forces the upper adjusting nut 38 upwards which moves rod 33 upwards vertically. As the rod 33 moves upward actuator block 41 affixed to rod 33 moves upward relative to upper switches 61, 62, and 63. The switch lever 64 of auxiliary switch 61 contacts upper surface 42 of actuator block 41 as seen in FIG. 5 to activate electric fans 12 before the load nut 26 and coupled curtains 14 complete their travel. Shortly thereafter the switch lever 64 of limit switch 62 contacts the step surface 53 to actuate the limit switch 62 which stops motor 18 from rotating thus halting the movement of the curtains 14. Should the limit switch 62 fail to stop motor 18 the step surface 54 of block 48 would contact and actuate safety switch 63 which would interrupt the power supply to motor 18 thereby preventing possible damage to motor 18 and curtains 14. It is to be understood that the length of the portions 52 and 56 and the thread of the screw 22 determine the time interval between switch actuations.

In a very similar manner, when the motor 18 and coupled screw 22 of power winch 16 are rotating in an opposite direction, the load nut 26 is moving downward relative to screw 22 until the slip ring member 31 moving concomitantly with the load nut 26 abuts the lower adjusting nut 39 forcing the nut 39 and rod 33 in downward vertical position. The affixed actuator block 41 is moved past the lower switches 61', 62' and 63'. Here the switch lever 64 of the auxiliary switch 61' contacts lower surface 43 of block 41 to actuate auxiliary switch 61' as seen in FIG. 5 to turn off electric fans 12 and related ventilation devices. Soon thereafter the switch lever 64 of the limit switch 62' contacts step surface 58 of block 41 to actuate limit switch 62' and stop the motor 18 and the relative movement of the curtains 14. Should the limit switch 62' fail to actuate the switch lever 64 of safety switch 63' will contact step surface 59 of actuator block 41 thereby interrupting the power supply to motor 18 to prevent damage to the motor 18, the curtains 14 and other related mechanisms. As may be understood the interruption of the power supply will normally trigger an alarm device in the circuit to alert the operator to any such malfunction.

While I have shown my invention in one form, it will be obvious to those skilled in the art that it is not so limited but is susceptible of various changes and modifications without departing from the spirit thereof.

What is claimed:

1. A switch actuating apparatus for use with a power winch, said power winch having main frame, a motor for moving a load bearing means within said main frame and a plurality of switches mounted within said frame, said switch actuating device comprising in combination:

(a) carrier means mounted within said main frame for selective concomitant movement with said load bearing means;

(b) connecting means for transferring movement from said load bearing means to said carrier means at selected positions;

(c) actuating means affixed to said carrier means for sequentially activating said plurality of switches responsive to movement of said carrier means.

2. A switch actuating apparatus as defined in claim 1 wherein said connecting means is affixed to said load bearing means for concomitant movement therewith to engage said carrier means in selected regions of said concomitant movement.

3. A switch actuating apparatus as defined in claim 1 wherein said carrier means is a rod resiliently mounted at each end within said frame for limited linear movement.

4. A switch actuating apparatus for use with a power winch, said power winch having main frame, a motor for moving a load bearing means within said main frame and a plurality of switches mounted within said frame, said switch actuating device comprising in combination:

(a) a rod resiliently mounted at each end within said frame for limited linear movement therein;

(b) a slip ring member extending from said load bearing means, said slip ring member terminating outwardly therefrom in a slip ring, said slip ring circumscribing said rod, wherein said slip ring member is affixed to said load bearing means for concomitant movement therewith to engage said rod in selected regions of said concomitant movement;

(c) actuating means affixed to said rod for sequentially activating said plurality of switches responsive to movement of said rod.

5. A switch actuating apparatus as defined in claim 4 wherein said actuating means is a block having an upper surface, a lower surface, opposing faces intermediate said upper and lower surfaces, and a plurality of stepped engagement surfaces defining relieved portions in said opposing faces, which engage and actuate said plurality of switches.

6. A switch actuating apparatus as defined in claim 5 wherein said relieved portions in said opposing faces are defined by a first stepped engagement surface extending a predetermined length from said upper surface of said block, a second stepped engagement surface adjacent said first stepped engagement surface, said second stepped engagement surface having a length different from said first stepped engagement surface.

7. A switch actuating apparatus as defined in claim 6 wherein said upper surface is cooperatively positioned to engage and actuate a first one of said plurality of switches upon movement of said block relative said plurality of switches, said second engagement surface is cooperatively positioned to engage and actuate a second of said plurality of switches upon further movement of said block in accordance with the length of said second engagement surface, said first engagement surface is cooperatively positioned to engage and actuate a third of said plurality of switches after an interval of time equal to time required for said block to move the length of said first engagement surface.

8. A switch actuating apparatus as defined in claim 7 wherein said plurality of switches include an auxiliary switch connected to an auxiliary device, a limit switch electrically connected to said motor and a safety switch electrically connected to a power supply which is electrically connected to said motor.

9. A switch actuating apparatus for use with a power winch, said power winch having main frame, a motor for moving a load bearing means within said main frame and a plurality of switches mounted within said frame said switch actuating apparatus comprising in combination:

(a) a rod resiliently mounted at each end within said frame for limited linear movement therein;

(b) a slip ring member extending from said load bearing means terminating outwardly therefrom in a slip ring, said slip ring circumscribing said rod; and (c) a block having and upper surface, a lower surface opposing faces intermediate said upper and lower surface and a plurality of stepped engagement surfaces defining a relieved portion of said opposing faces which engage and actuate said plurality of switches.

10. A switch actuating apparatus as defined in claim 9 wherein said relieved portions in said opposing faces are defined by a first stepped engagement surface extending a predetermined length from said upper surface of said block, a second stepped engagement surface adjacent said first stepped engagement surface, said second stepped engagement surface having a length different from said first stepped engagement surface.

11. A switch actuating apparatus as defined in claim 10 wherein said upper surface is cooperatively positioned to engage and actuate a first one of said plurality of switches upon movement of said block relative said plurality of switches, said second engagement surface is cooperatively positioned to engage and actuate a second of said plurality of switches upon further movement of said block in accordance with the length of said second engagement surface, said first engagement surface is cooperatively positioned to engage and actuate a third of said plurality of said switches after an interval of time equal to time required for said block to move the length of said first engagement surface.

12. A switch actuating apparatus as defined in claim 9 wherein said slip ring member and said slip ring are affixed to said load bearing means for concomitant movement therewith to engage said rod in selected regions of said concomitant movement.

13. A switch actuating apparatus as defined in claim 9 wherein said plurality of switches include an auxiliary switch connected to an auxiliary device, a limit switch electrically connected to said motor and a safety switch electrically connected to a power supply which is electrically connected to said motor.

14. A switch actuating apparatus as defined in claim 13 wherein said auxiliary device includes fans and motorized vents.

15. A switch actuating apparatus as defined in claim 13 wherein said limit switch is electrically connected to stop said motor when said limit switch is activated by said block.

16. A switch actuating apparatus as defined in claim 13 wherein safety switch interrupts said power supply to said motor when said safety switch is activated by said block.

* * * * *